US012753112B2

(12) United States Patent

Sakurai et al.

(10) Patent No.: US 12,753,112 B2

(45) Date of Patent: Oct. 6, 2026

(54) OPAQUE QUARTZ GLASS AND METHOD FOR PRODUCING THE SAME

(71) Applicant: TOSOH SGM CORPORATION, Yamaguchi (JP)

(72) Inventors: Manabu Sakurai, Yamaguchi (JP); Minoru Kuniyoshi, Yamaguchi (JP); Takayuki Kikuchi, Ibaraki (JP); Yuta Shimasaki, Yamaguchi (JP); Mori Bamba, Yamaguchi (JP); Yuki Itoh, Yamaguchi (JP)

(73) Assignee: TOSOH SGM CORPORATION, Yamaguchi (JP)

( * ) Notice: Subject to any disclaimer, the term of this patent is extended or adjusted under 35 U.S.C. 154(b) by 511 days.

(21) Appl. No.: 18/558,213

(22) PCT Filed: Feb. 20, 2023

(86) PCT No.: PCT/JP2023/005906

§ 371 (c)(1),
(2) Date: Oct. 31, 2023

(87) PCT Pub. No.: WO2023/167030

PCT Pub. Date: Sep. 7, 2023

(65) Prior Publication Data

US 2024/0217866 A1 Jul. 4, 2024

(30) Foreign Application Priority Data

Mar. 1, 2022 (WO) .................. PCT/JP2022/008532

(51) Int. Cl.

*C03C 11/00* (2006.01)
*C03B 19/06* (2006.01)
*C03C 3/06* (2006.01)

(52) U.S. Cl.

CPC ............ *C03C 11/00* (2013.01); *C03B 19/063* (2013.01); *C03B 19/066* (2013.01); *C03C 3/06* (2013.01); *C03C 11/007* (2013.01); *C03B 2201/02* (2013.01); *C03C 2204/04* (2013.01)

(58) Field of Classification Search

CPC ......... C03C 11/00; C03C 3/06; C03C 11/007; C03C 2201/02; C03C 2204/04; C03B 19/063; C03B 19/066; C03B 19/06; C03B 20/00

See application file for complete search history.

(56) References Cited

U.S. PATENT DOCUMENTS

| | | | |
|---|---|---|---|
| 5,497,004 A | 3/1996 | Rudolph et al. | |
| 5,585,173 A | 12/1996 | Kamo et al. | |
| 5,736,206 A | 4/1998 | Englisch et al. | |
| 2017/0174560 A1* | 6/2017 | Hirai | C03B 19/066 |
| 2019/0092674 A1* | 3/2019 | Otter | C03C 3/06 |

FOREIGN PATENT DOCUMENTS

| | | | |
|---|---|---|---|
| CN | 106029586 | A | 10/2016 |
| CN | 113165938 | A | 7/2021 |
| CN | 113966316 | A | 1/2022 |
| JP | H04-65328 | A | 3/1992 |
| JP | H05-254882 | A | 10/1993 |
| JP | H07-267724 | A | 10/1995 |
| JP | H08-143329 | A | 6/1996 |
| JP | H09-506324 | A | 6/1997 |
| JP | 2014-88286 | A | 5/2014 |
| JP | 2014091634 | A | 5/2014 |
| JP | 2015166292 | A | 9/2015 |
| JP | 2015-209372 | A | 11/2015 |
| JP | 2018-70397 | A | 5/2018 |
| JP | 2018-135259 | A | 8/2018 |
| JP | 2019-502630 | A | 1/2019 |
| JP | 2020-033221 | A | 3/2020 |
| JP | 6751822 | B1 | 9/2020 |
| KR | 20170106217 | A | 9/2017 |

(Continued)

OTHER PUBLICATIONS

Office action for corresponding Chinese application No. 202380011514.4; dated Aug. 1, 2025 (12 pages). Machine Translation.

International Search Report and Written Opinion for corresponding International application No. PCT/JP2023/005906; dated May 16, 2023 (14 pages) Machine Translation.

International Search Report and Written Opinion for corresponding International application No. PCT/JP2022/008532; dated May 17, 2022 (14 pages) Machine Translation.

Extended European Search Report for corresponding European patent application No. 23763289.8-1105; dated Jan. 28, 2026 (7 pages).

Office action for corresponding Taiwanese patent application No. 112106975; dated Mar. 2, 2026 (10 pages). Machine Translation.

International preliminary report on patentability for corresponding International patent application No. PCT/JP2023/005906; dated Sep. 12, 2024 (11 pages).

(Continued)

*Primary Examiner* — Elizabeth A. Bolden

(74) *Attorney, Agent, or Firm* — Mendelsohn Dunleavy, P.C.; Kevin J. Dunleavy

(57) ABSTRACT

An object of the present invention is to provide an opaque quartz glass containing pores with irregular shapes and having sufficient heat ray reflecting, heat ray blocking and light shielding properties, and further to provide a method for producing the opaque quartz glass. The opaque quartz glass of the present invention is an opaque quartz glass containing pores with irregular shapes dispersed in a glass body, wherein the opaque quartz glass has a pore size distribution of the pores having $D_{50}$ of 4 to 30 μm, a proportion of pores with pore sizes of 5 μm or less of 1 to 50%, and a proportion of pores with pore sizes of 15 μm or less of 30 to 90%, and an area ratio of pores in a microscopic image at a cross section of 5% or more. The opaque quartz glass of the present invention is obtained by mixing a plurality of types of the specific silica powders having different particle size distributions from each other at a predetermined formulation, and sintering a pressure-molded article of the mixed powder.

16 Claims, 4 Drawing Sheets

(56) References Cited

FOREIGN PATENT DOCUMENTS

| | | | |
|---|---|---|---|
| TW | 201733931 | A | 10/2017 |
| TW | 202106639 | A | 2/2021 |
| WO | 2020245874 | A1 | 12/2020 |

OTHER PUBLICATIONS

International preliminary report on patentability for corresponding International patent application No. PCT/JP2022/008532; dated Sep. 12, 2024 (11 pages).
Office action for corresponding Chinese application No. 202380011514.4; dated Mar. 31, 2026 (12 pages) Machine Translation.
Office action for corresponding Chinese application No. 202380011514.4; dated Jun. 8, 2026 (11 pages) Machine Translation.
Office action for corresponding Korean application No. 10-2023-7037662; dated Aug. 25, 2026 (21 pages). Machine Translation.

* cited by examiner

OPAQUE QUARTZ GLASS AND METHOD FOR PRODUCING THE SAME

CROSS REFERENCE TO RELATED APPLICATIONS

This application claims priority to International Application No. PCT/JP2022/008532, filed Mar. 1, 2022, the entire description of which is expressly incorporated herein by reference.

TECHNICAL FIELD

The present invention relates to an opaque quartz glass that can be suitably used, for example, as a member for semiconductor manufacturing apparatuses, a component of optical apparatuses, and the like, and to a method for producing the same.

BACKGROUND ART

Quartz glasses, which are excellent in light transmittance, heat resistance, and chemical resistance, are used in various applications such as lighting apparatuses, optical apparatus components, semiconductor industrial components, and physical and chemical apparatuses. Opaque quartz glasses which are quartz glasses containing pores have excellent heat ray reflecting and heat ray blocking properties and therefore have been utilized as flanges and furnace tubes for semiconductor heat treatment apparatuses. Opaque quartz glasses have also excellent light shielding property and therefore utilized as optical device components such as a reflector base material for light source lamps for projector.

The opaque quartz glasses are whitened by containing pores therein to obtain the heat ray reflecting, heat ray blocking and light shielding properties. Opaque quartz glasses can be roughly classified based on whether the shape of their pores is spherical or irregular.

The opaque quartz glasses containing pores with a spherical shape can be produced by, for example, a method of adding a foaming agent such as silicon nitride to silica powder and melting the mixture (see, for example, Patent Literatures 1 and 2). In this method, since the foaming agent vaporizes to form pores, it is difficult to suppress an increase in the pore diameter, and the pores become too large, resulting in a problem where the density and mechanical strength are reduced. In addition, a problem exists that the heat ray reflecting, heat ray blocking and light shielding properties tend to deteriorate.

In contrast, opaque quartz glasses containing pores with irregular shapes can be produced by, for example, a method of sintering an amorphous silica powder at a melting temperature or lower without using the foaming agent (see, for example, Patent Literatures 3 to 5). When the pores have irregular shapes, since interface areas between the pores and glass increase, there is an advantage that light (general electromagnetic waves including visible light, infrared ray, and ultraviolet ray; the same applies hereinafter.) is easily reflected and scattered. For example, Patent Literature 3 describes an opaque quartz glass having a direct spectral transmittance of less than 10% in a wall thickness of 1 mm, which is substantially constant in a wavelength range from $\lambda$=190 nm to $\lambda$=2650 nm.

However, the producing methods described in Patent Literatures 3 to 5 unfortunately require forming a slurry and solidifying and drying the slurry in a mold, which require a long time during solidification and drying of the slurry, in order to form a molded body without cracks.

As a method to improve this point, a method for producing opaque quartz glass has been proposed in which silica slurry is spray-dried and granulated, pressure-molded, and then sintered (see, for example, Patent Literatures 6 to 8). For example, Patent Literature 6 describes an opaque quartz glass having an infrared ray linear transmittance of 0.7% (wavelength 2 μm and sample thickness 1 mm). Patent Literature 8 describes an opaque quartz glass that is controlled so that the shape of the pores in the quartz glass is substantially spherical and an average particle diameter of the pores is 1 μm or less, with a whiteness of 90% or more at a thickness of 10 mm and a reflectance of 85% or more at a thickness of 3 mm at a wavelength of 0.2 to 3 μm.

Patent Literature 1: Japanese Patent Publication No. H4-065328

Patent Literature 2: Japanese Patent Publication No. H5-254882

Patent Literature 3: Japanese Patent Publication No. H7-267724 (U.S. Pat. No. 5,497,004 A)

Patent Literature 4: Japanese Patent Publication No. H8-143329 (U.S. Pat. No. 5,585,173 A)

Patent Literature 5: Published Japanese Translation No. H9-506324 of PCT International Publication (U.S. Pat. No. 5,736,206 A)

Patent Literature 6: Japanese Patent Publication No. 2014-088286

Patent Literature 7: Japanese Patent Publication No. 2018-070397

Patent Literature 8: Japanese Patent No. 6751822

The entire descriptions in Patent Literatures 1 to 8 are expressly incorporated herein by reference.

SUMMARY OF INVENTION

Technical Problem

However, the opaque quartz glasses described in Patent Literatures 3 to 7 contain the pores with irregular shapes, but the heat ray reflecting, heat ray blocking and light shielding properties are not sufficient. For example, Patent Literatures 3 and 6 describe that the linear transmittance of opaque quartz glass is low, as described above, but many light is transmitted in directions other than the linear direction (traveling direction of incident light) while being scattered by interactions with pores.

Furthermore, the opaque quartz glass of Patent Literature 8 is manufactured by controlling the shape of pores to be substantially true sphere in a manufacturing method in which the shape of pores is usually irregular. Since such a control of the shape of pores is complicated, it is preferable to obtain sufficient heat ray reflecting, heat ray blocking and light shielding properties while the shape of the pores remains irregular.

Thus, in the conventional method, it is difficult to obtain the opaque quartz glass containing the pores with irregular shapes and having sufficient heat ray reflecting, heat ray blocking and light shielding properties.

An object of the present invention is to provide an opaque quartz glass containing the pores with irregular shapes and having sufficient heat ray reflecting, heat ray blocking and light shielding properties. In another aspect, an object of the present invention is to provide a method for producing opaque quartz glass, that enables the production of the opaque quartz glass.

Solution to Problem

The present inventors had made intensive studies to solve the problem above, and they thereby find that the opaque quartz glass containing the pores with irregular shapes and having sufficient heat ray reflecting, heat ray blocking and light shielding properties can be obtained by mixing a plurality of types of specific silica powders having different particle size distributions from each other and an SiO powder at a predetermined formulation, and sintering a pressure-molded article of the mixed powder, resulting in the completion of the present invention.

The present invention is as follows.

[1]

An opaque quartz glass containing pores with irregular shapes dispersed in a glass body, wherein the opaque quartz glass has a pore size distribution of the pores having $D_{50}$ of 4 to 30 μm, a proportion of pores with pore sizes of 5 μm or less of 1 to 50%, and a proportion of pores with pore sizes of 15 μm or less of 30 to 90%, and an area ratio of pores in a microscopic image at a cross section of 5% or more.

[2]

The opaque quartz glass according to [1], wherein a circularity of pores is 0.62 or less.

[3]

The opaque quartz glass according to [1] or [2], wherein

- when $D_{50}$ is 10 μm or less, the area ratio is 15% or more,
- when $D_{50}$ is more than 10 μm, the area ratio is less than 15%.

[4]

The opaque quartz glass according to any one of [1] to [3], wherein the opaque quartz glass has an infrared reflectance of 75% or more, an SCE reflectance of 75% or more at a wavelength of 350 nm to 750 nm, and a brightness L* of 85 or more in L*a*b* color system.

[5]

The opaque quartz glass according to any one of [1] to [4], wherein the opaque quartz glass has an absolute value of a saturation a* of 2 or less and an absolute value of b* of 4 or less in L*a*b* color system.

[6]

The opaque quartz glass according to any one of [1] to [5], wherein each content of metallic impurities is 1 ppm or less.

[7]

The opaque quartz glass according to any one of [1] to [6], wherein the opaque quartz glass has a density of 2.10 to 2.18 $g/cm^3$.

[8]

The opaque quartz glass according to any one of [1] to [7], wherein the opaque quartz glass has a density distribution of 2% or less and a brightness L* distribution of 2% or less.

[9]

A method for producing the opaque quartz glass according to any one of [1] to [8], comprising:

- pressure-molding a mixed powder of a silica powder which is silica particles having $D_{50}$ of 5 to 100 μm in a particle size distribution and a fine particulate silica which is silica particles having a BET diameter of 10 to 50 nm, wherein the content of the fine particulate silica is 20 to 50 mass % relative to the total amount of a silica material including the silica powder and the fine particulate silica, and
- sintering the pressure-molded article.

[10]

The method for producing opaque quartz glass according to [9], wherein

- (a) the silica powder is a synthetic silica powder having $D_{50}$ of 30 to 100 μm in a particle size distribution, or
- (b) the silica powder contains a synthetic silica powder having $D_{50}$ of 30 to 100 μm in a particle size distribution and a spherical silica powder having $D_{50}$ of 5 to 50 μm in a particle size distribution, or
- (c) the silica powder is a spherical silica powder having $D_{50}$ of 5 to 50 μm in a particle size distribution.

[11]

The method for producing opaque quartz glass according to [10], wherein in the case (b), the content of the spherical silica powder is 1 to 20 mass % relative to the total amount of the silica material.

[12]

The method for producing opaque quartz glass according to [10] or [11], when the synthetic silica powder and the spherical silica powder are present respectively,

- $D_{10}$ in a particle size distribution of the synthetic silica powder is ⅓ or more of $D_{50}$ and $D_{90}$ is 3 times or less of $D_{50}$, and
- $D_{10}$ in a particle size distribution of the spherical silica powder is ⅕ or more of $D_{50}$ and $D_{90}$ is 5 times or less of $D_{50}$.

[13]

The method for producing opaque quartz glass according to any one of [9] to [12], wherein the fine particulate silica satisfies at least one of the four requirements of

- (i) a tapped bulk density is 0.03 to 0.10 $g/cm^3$,
- (ii) a BET specific surface area is 50 to 100 $m^2/g$,
- (iii) an OH group concentration is 0.5 to 1.0 mass %, and
- (iv) each content of metallic impurities other than Si is 1 ppm or less.

[14]

The method for producing opaque quartz glass according to any one of [9] to [13], wherein the mixed powder further comprises a SiO powder which is silicon monoxide particles having $D_{50}$ of 0.5 to 2 μm in a particle size distribution, and the content of the SiO powder is 0.1 to 1 mass % by external addition relative to the total amount of the silica material.

[15]

The method for producing opaque quartz glass according to [14], wherein the SiO powder has $D_{10}$ of 0.1 μm or more and $D_{90}$ of 5 μm or less in a particle size distribution.

[16]

The method for producing opaque quartz glass according to any one of [9] to [15], wherein a tapped bulk density of the mixed powder for pressure molding is 5 to 20 times more than a tapped bulk density of the fine particulate silica.

Effect of Invention

The present invention allows to provide the opaque quartz glass containing the pores with irregular shapes and having sufficient heat ray reflecting, heat ray blocking and light shielding properties. In another aspect, the present invention allows to provide a method for producing opaque quartz glass, that enables the production of the opaque quartz glass.

EMBODIMENTS OF INVENTION

<Opaque Quartz Glass>

Figure 1:
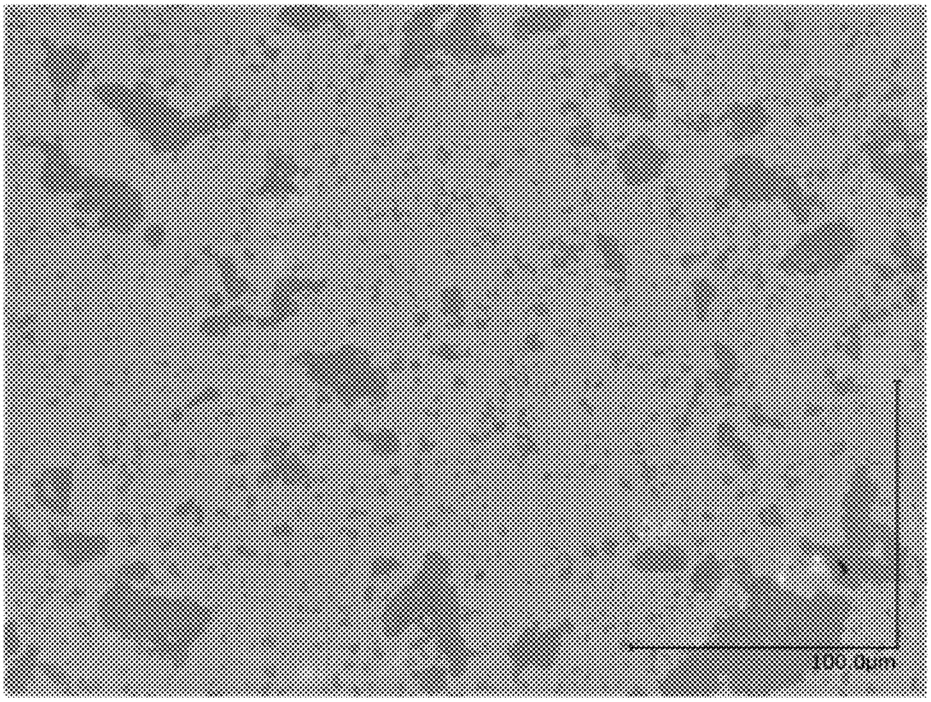
FIG. 1 is an optical micrograph of a quartz glass cross section in Example 3.

The opaque quartz glass of the present invention is an opaque quartz glass containing pores with irregular shapes dispersed in a glass body, wherein the opaque quartz glass has a pore size distribution of pores having $D_{50}$ of 4 to 30 μm, a proportion of pores with pore sizes of 5 μm or less of 1 to 50%, and a proportion of pores with pore sizes of 15 μm or less of 30 to 90%, and an area ratio of pores in a microscopic image at a cross section of 5% or more.

The opaque quartz glass of the present invention contains dispersed pores with irregular shapes. In the present invention and the present specification, "pores with irregular shapes" means pores having a circularity of 0.7 or less. A method for measuring the circularity is described in detail in the Examples section. The glass body includes the irregular shape pores, facilitating light reflection and scattering by the pores more easily than in the case of the spherical shape pores. As a result, compared to the opaque quartz glass containing the spherical shape pores, it is possible to suppress the amount of pores necessary to achieve the same degree of the heat ray reflecting, heat ray blocking and light shielding properties, and the opaque quartz glass of the present invention has an advantage that the density is easily improved. The circularity of the pores is preferably 0.65 or less, more preferably 0.63 or less, and still more preferably 0.62 or less from the viewpoint of facilitating light reflection and scattering by the pores. The lower limit value of the circularity of the pores is not particularly limited, but may be 0.40, 0.45, 0.50, or 0.52.

In a pore size distribution of the pores in the opaque quartz glass of the present invention, the median diameter (area basis) $D_{50}$ is 4 to 30 μm, a proportion of pores with pore sizes of 5 μm or less is 1 to 50%, and a proportion of pores with pore sizes of 15 μm or less is 30 to 90%. When the pore size distribution of pores satisfies the above requirements, light reflection and scattering easily occur in a wide wavelength range. Furthermore, when $D_{50}$ is 30 μm or less, the proportion of pores with pore sizes of 5 μm or less is 50% or less, or the proportion of pores with pore sizes of 15 μm or less is 90% or less, the opaque quartz glass can ensure to be sufficiently dense and the strength is easily suppressed from decreasing. The method for measuring the pore size distribution is described in detail in the Examples section.

The upper limit value of $D_{50}$ in the pore size distribution is preferably 27 μm or less, or 25 μm or less, and may be 15 μm or less, or 10 μm or less, from the viewpoint of obtaining more sufficient heat ray reflecting, heat ray blocking and light shielding properties. The lower limit value of $D_{50}$ is preferably 4.5 μm or more, or 5 μm or more. $D_{50}$ can be, for example, 4 to 27 μm, 4 to 10 μm, 4.5 to 9.5 μm or 5 to 9 μm.

The upper limit value of the proportion of pores with pore sizes of 5 μm or less is preferably 47% or less or 45% or less, more preferably 43% or less, and particularly preferably 40% or less from the viewpoint of obtaining more sufficient heat ray reflecting, heat ray blocking and light shielding properties. The lower limit value of the proportion of pores with pore sizes of 5 μm or less is preferably 3% or more, more preferably 4% or more, particularly preferably 5% or more, may be 10% or more, 15% or more, 20% or more, or 25% or more. The proportion of pores with pore sizes of 5 μm or less can be, for example, 3 to 50%, 10 to 50%, 15 to 50%, 20 to 47% or 25 to 45%.

The upper limit value of the proportion of pores with pore sizes of 15 μm or less is preferably 88% or less, or 87% or less, more preferably 86% or less, and particularly preferably 85% or less from the viewpoint of obtaining more sufficient heat ray reflecting, heat ray blocking and light shielding properties. The lower limit value of the proportion of pores with pore sizes of 15 μm or less is preferably 34% or more, more preferably 36% or more, particularly preferably 38% or more, and may be 40% or more, 45% or more, 50% or more, 55% or more, or 60% or more. The proportion of pores with pore sizes of 15 μm or less can be, for example, 34 to 90%, 36 to 90%, 38 to 90%, 60 to 90%, 65 to 87% or 70 to 86%.

In the opaque quartz glass of the present invention, an area ratio of pores in a microscopic image at a cross section is 5% or more. When the area ratio is 5% or more, light reflection and scattering per unit space come to easily occur, and sufficient heat ray reflecting, heat ray blocking and light shielding properties can be achieved. The area ratio of pores is preferably 7% or more, and may be 9% or more, 10% or more, 15% or more, 18% or more, 19% or more, or 20% or more from the viewpoint of obtaining more sufficient heat ray reflecting, heat ray blocking and light shielding properties. The area ratio of pores is preferably 45% or less, more preferably 40% or less, and still more preferably 37% or less from the viewpoint of ensuring the strength of the opaque quartz glass. The method for measuring the area ratio of pores is described in detail in the Examples section.

In particular, when $D_{50}$ in the pore size distribution is 10 μm or less, the area ratio of pores is preferably 15% or more. This is to increase the area ratio of pores to increase the amount of interface between the pores and the glass, because when $D_{50}$ in the pore size distribution is 10 μm or less, there are many relatively small pores, the surface area of the individual pores is small, and the circularity of the pores tends to increase (that is, the pore shape approaches a circle). On the other hand, when $D_{50}$ in the pore size distribution is more than 10 μm, the area ratio of pores is preferably less than 15%. This is to reduce the amount of the pores to ensure the strength of the opaque quartz glass, because when $D_{50}$ in the pore size distribution is more than 10 μm, there are many relatively large pores and the density of the opaque quartz glass tends to decrease. Since the circularity of large pores tends to decrease, sufficient heat ray reflecting, heat ray blocking and light shielding properties can be ensured even if the area ratio of pores is small.

The opaque quartz glass of the present invention has the above-described configuration, and thus has sufficient heat ray reflecting, heat ray blocking and light shielding properties. In the present specification, having "sufficient heat ray reflecting and heat ray blocking properties" means that the infrared reflectance is 75% or more. In addition, in the present specification, having "sufficiently light shielding property" means that SCE reflectance at a wavelength from 350 nm to 750 nm is 75% or more and the brightness L* in L*a*b* color system is 85 or more.

That is, the opaque quartz glass of the present invention has an infrared reflectance of 75% or more. When the reflectance of infrared ray, which is a heat ray, is 75% or more, sufficient heat ray reflecting and heat ray blocking properties can be obtained. The infrared reflectance is preferably high, preferably 80% or more, and more preferably 85% or more from the viewpoint of enhancing the heat ray reflecting and heat ray blocking properties. The upper limit value of the infrared reflectance is not particularly limited, but may be 99%. For example, the infrared reflectance can be increased by adjusting the circularity of pores, the pore size distribution, and the area ratio of pores to the above-described preferred range, respectively.

The opaque quartz glass of the present invention has SCE reflectance at a wavelength from 350 nm to 750 nm of 75% or more. SCE reflectance at a wavelength from 350 nm to 750 nm is measured in accordance with JIS Z 8722. SCE reflectance is preferably higher, preferably 78% or more, more preferably 80% or more from the viewpoint of enhancing the light shielding property. The upper limit value of SCE reflectance is not particularly limited, but may be 99%. For example, SCE reflectance can be increased by adjusting the circularity of pores, the pore size distribution, and the area ratio of pores to the above-described preferred ranges, respectively.

The opaque quartz glass of the present invention has a brightness L* in L*a*b* color system of 85 or more. When the brightness L* is 85 or more, sufficient light shielding properties can be obtained, and in addition, color unevenness is less likely to occur, resulting in sufficient white color. The brightness L* is preferably 87.5 or more, and more preferably 90 or more from the viewpoint of enhancing the light shielding property and increasing the whiteness. The upper limit value of the brightness L* is not particularly limited, but may be 99. For example, the brightness L* can be increased by adjusting the circularity of pores, the pore size distribution, and the area ratio of pores to the above-described preferred ranges, respectively.

In addition, the opaque quartz glass of the present invention preferably has a absolute value of a saturation a* of 2 or less and a absolute value of b* of 4 or less in L*a*b* color system. When the saturations a* and b* are within the above ranges, SCE reflectance is further improved, and the color tone of the opaque quartz glass become more white. The absolute value of the saturation a* is preferably 1 or less, and more preferably 0.5 or less. The absolute value of the saturation b* is preferably 3 or less, more preferably 2 or less, and particularly preferably 1 or less. The upper limit value of the saturations a* and b* are not particularly limited, but may be 0.1. For example, the saturations a* and b* can be reduced by adjusting the circularity of pores, the pore size distribution, and the area ratio of pores to the above-described preferred ranges, respectively.

Each content of metallic impurities in the opaque quartz glass of the present invention is preferably 1 ppm or less. When each content of the metallic impurities other than Si element is 1 ppm or less, an occurrence of process contamination can be more easily avoided in fields of semiconductor manufacturing or the like. Furthermore, deterioration in measurement accuracy due to fluorescent generation or the like can be more easily avoided in fields of optical analysis or the like. The contents of the metallic impurities can be analyzed by a method such as an atomic absorption spectrometry.

The opaque quartz glass preferably has a density of 2.10 to 2.18 g/cm$^3$. The density of 2.10 g/cm$^3$ or more allows to further improve the strength of the opaque quartz glass. In addition, the density of 2.18 g/cm$^3$ or less allows to more easily ensure a sufficient amount of pores and to obtain an opaque quartz glass having more sufficient heat ray reflecting, heat ray blocking and light shielding properties. The density is more preferably 2.14 to 2.17 g/cm$^3$.

A density distribution in the opaque quartz glass of the present invention is preferably 2% or less. When the density distribution is 2% or less, distributions of the infrared reflectance, SCE reflectance and brightness L* in the opaque quartz glass become more uniform. The density distribution is more preferably 1.7% or less, and still more preferably 1.5% or less.

The brightness L* of the opaque quartz glass is preferably 2% or less. When the brightness L* is 2% or less, a deterioration in yield can be more easily avoided in fields of semiconductor manufacturing or the like, and a deterioration in measurement accuracy due to fluorescent generation or the like can be more easily avoided in fields of optical analysis or the like. The brightness L* is more preferably 1.7% or less, and still more preferably 1.5% or less.

As described above, the opaque quartz glass of the present invention has the infrared reflectance of 75% or more, the SCE reflectance of 75% or more at a wavelength from 350 nm to 750 nm, and the brightness L* of 85 or more in L*a*b* color system, resulting in sufficient heat ray reflecting, heat ray blocking and light shielding properties.

Furthermore, the opaque quartz glass of the present invention has an advantage that the density is easily improved, as compared with the opaque quartz glass containing the spherical shape pores. Therefore, the opaque quartz glass of the present invention can sufficiently accommodate larger sizes while ensuring color uniformity and it is possible to be made into an ingot shape with a thickness of 30 cm and a diameter of 80 cm, for example, since its mechanical strength can be easily increased. The ingot of the opaque quartz glass can be processed by a processing machine used in manufacturing quartz members, such as a band saw, a wire saw, or a core drill, to obtain opaque quartz glass products.

The opaque quartz glass of the present invention has a further effect that it has sufficient color uniformity without color unevenness with sufficient white and that it can be joined with transparent quartz glasses.

The opaque quartz glass of the present invention is useful in semiconductor applications and in optical applications in general, and can be suitably used for, for example, a quartz glass cell for optical analysis, a light shielding member and an infrared reflecting member for semiconductor manufacturing apparatuses or infrared heating apparatuses.

<Method for Producing Opaque Quartz Glass>

A method for producing opaque quartz glass according to the present invention comprises: pressure-molding a mixed powder of a silica powder which is silica particles having $D_{50}$ of 5 to 100 μm in a particle size distribution and a fine particulate silica which is silica particles having a BET diameter of 10 to 50 nm, wherein the content of the fine particulate silica is 20 to 50 mass % relative to the total amount of a silica material including the silica powder and the fine particulate silica, and sintering the pressure-molded article. As described above, the opaque quartz glass of the present invention is a sintered body of a mixed powder obtained by mixing a plurality of types of specific silica powders having different particle size distributions from each other at a predetermined formulation.

The silica powder is silica particles having $D_{50}$ of 5 to 100 μm in a particle size distribution, wherein the following requirements (a) to (c) are preferably satisfied. This allows to more easily realize sufficient heat ray reflecting, heat ray blocking and light shielding properties in the opaque quartz glass.

(a) The silica powder is a synthetic silica powder having $D_{50}$ of 30 to 100 μm in a particle size distribution.

(b) The silica powder contains a synthetic silica powder having $D_{50}$ of 30 to 100 μm in a particle size distribution and a spherical silica powder having $D_{50}$ of 5 to 50 μm in a particle size distribution.

(c) The silica powder is a spherical silica powder having $D_{50}$ of 5 to 50 μm in a particle size distribution.

By adding the fine particulate silica to the synthetic silica powder or the spherical silica powder, or to the mixed silica powder of the synthetic silica powder and the spherical silica powder as described above, the structure of the sintered body can be made more uniform, and the heating time up to the maximum temperature can be further shortened.

The synthetic silica powder is, for example, a high-purity powdery silica obtained by hydrolyzing, drying, pulverizing, and sintering a chemically purified silicon alkoxide. Commercially available synthetic silica powders can also be used as long as $D_{50}$ in a particle size distribution is 30 to 100 μm. $D_{50}$ in a particle size distribution of the synthetic silica powder is preferably 50 to 95 μm, and more preferably 60 to 90 μm from the viewpoint of more easily realizing sufficient heat ray reflecting, heat ray blocking and light shielding properties. From the same viewpoint, $D_{10}$ in a particle size distribution of the synthetic silica powder is preferably ⅓ or more of $D_{50}$, and $D_{90}$ is preferably 3 times or less of $D_{50}$. In particular, the silica powder is preferably a synthetic silica powder having $D_{50}$ of 30 to 100 μm, $D_{10}$ of ⅓ or more of $D_{50}$, and $D_{90}$ of 3 times or less of $D_{50}$ in a particle size distribution, from the viewpoint of making the structure of sintered bodies more uniform and further shortening the heating time up to the maximum temperature during sintering.

The content of the synthetic silica powder relative to the total amount of the silica material (the synthetic silica powder, the spherical silica powder, and the fine particulate silica) may be 1 to 80 mass % from the viewpoint of more easily realizing sufficient heat ray reflecting, heat ray blocking and light shielding properties. The upper limit value of the content is preferably 70 mass % or less, and preferably 65 mass % or less. The lower limit value of the content may be 20 mass % or more, or 30 mass % or more. In case that the silica powder consists of only the synthetic silica powder (the requirement a), the content of the synthetic silica powder relative to the total amount of the silica material may be 50 to 75 mass % or 60 to 70 mass %. In case that the silica powder comprises both the synthetic silica powder and the spherical silica powder (the requirement b), the content of the synthetic silica powder relative to the total amount of the silica material may be 20 to 70 mass %, 25 to 65 mass % or 30 to 60 mass %.

The spherical silica powder is a high-purity synthetic fused silica obtained by reacting a silicon tetrachloride gas or the like in a gas phase. Commercially available spherical silica powders can also be used as long as $D_{50}$ in a particle size distribution is 5 to 50 μm. $D_{50}$ of the spherical silica powder in a particle size distribution is preferably 7 to 40 μm, and more preferably 8 to 35 μm from the viewpoint of more easily realizing sufficient heat ray reflecting, heat ray blocking and light shielding properties. From the same viewpoint, $D_{10}$ of the spherical silica powder in a particle size distribution is preferably ⅕ or more of $D_{50}$, and $D_{90}$ is preferably 5 times or less of $D_{50}$.

The content of the spherical silica powder relative to the total amount of the silica material may be 1 to 80 mass % from the viewpoint of more easily realizing sufficient heat ray reflecting, heat ray blocking and light shielding properties. The upper limit value of the content is preferably 75 mass % or less, and preferably 73 mass % or less. The lower limit value of the content may be 3 mass % or more, or 4 mass % or more. In case that the silica powder consists of only the spherical silica powder (the requirement c), the content of the spherical silica powder relative to the total amount of the silica material may be 50 to 75 mass % or 55 to 73 mass %. In case that the silica powder comprises both the synthetic silica powder and the spherical silica powder (the requirement b), the content of the spherical silica powder relative to the total amount of the silica material may be 1 to 50 mass %, 1 to 40 mass %, 1 to 30 mass %, 1 to 25 mass %, 1 to 20 mass %, 3 to 15 mass % or 4 to 13 mass %. The silica powder for the opaque quartz glass of the present invention, for example, comprises the synthetic silica powder having $D_{50}$ of 30 to 100 μm in a particle size distribution and the spherical silica powder having $D_{50}$ of 5 to 50 μm in a particle size distribution, and the content of the spherical silica powder is 1 to 20 mass % relative to the total amount of the silica material.

In particular, the silica powder preferably contains the synthetic silica powder having $D_{50}$ of 30 to 100 μm, $D_{10}$ of ⅓ or more of $D_{50}$ and $D_{90}$ of 3 times or less of $D_{50}$ in a particle size distribution, and the spherical silica powder having $D_{50}$ of 5 to 50 μm, $D_{10}$ of ⅕ or more of $D_{50}$ and $D_{90}$ of 5 times or less of $D_{50}$ in a particle size distribution, wherein the content of the spherical silica powder is 1 to 50 mass %, 1 to 40 mass %, 1 to 30 mass %, or 1 to 20 mass % relative to the total amount of the silica material, from the viewpoint of making the structure of sintered bodies more uniform, and shortening the heating time up to the maximum temperature during sintering. When the silica powder is a mixture of the synthetic silica powder and the spherical silica powder, the silica powder preferably has two peaks in the particle size range of 5 to 100 μm on a particle size distribution, with a particle size ratio of the peaks (a peak particle size derived from the synthetic silica powder/a peak particle size derived from the spherical silica powder) of 2 to 10 and a frequency ratio of the peaks (a peak frequency derived from the synthetic silica powder/a peak frequency derived from the spherical silica powder) of 0.1 to 0.4.

The fine particulate silica is, for example, fumed silica obtained by burning a silicon tetrachloride gas or the like in a gas phase, colloidal silica obtained by a precipitation method, or the like. Commercially available fine particulate silica can also be used as long as the BET diameter of the silica particles is 10 to 50 nm. The BET diameter of the fine particulate silica is preferably 15 to 45 nm, and more preferably 20 to 40 nm from the viewpoint of more easily realizing sufficient heat ray reflecting, heat ray blocking and light shielding properties. The BET diameter is a particle size calculated based on a specific surface area S ($m^2/g$) measured by BET method and the true density of a substance ρ ($g/cm^3$) with the formula of BET diameter (nm)=6000/(S×ρ). The BET diameter (nm) of silica particles (the true density 2.2 $g/cm^3$) is obtained by 2727/S.

It is preferable to use the fine particulate silica that satisfies at least one of the following four requirements (i) to (iv) from the viewpoint of more easily realizing sufficient heat ray reflecting, heat ray blocking and light shielding properties.

(i) Tapped bulk density is 0.03 to 0.10 $g/cm^3$.

(ii) BET specific surface area is 50 to 100 $m^2/g$.

(iii) OH group content is 0.5 to 1.0 mass %.

(iv) Each content of metallic impurities other than Si is 1 ppm or less.

Furthermore, the fine particulate silica preferably satisfies at least two, more preferably at least three, and particularly preferably all four of the four requirements above.

The fine particulate silica is preferably 25 to 45 mass %, more preferably 30 to 40 mass % relative to the total amount of the silica material from the viewpoint of more easily realizing sufficient heat ray reflecting, heat ray blocking and light shielding properties.

In one aspect, the mixed powder for pressure molding may contain silicon monoxide particles (an SiO powder). When the SiO powder is contained, the SiO powder is preferably silicon monoxide particles having $D_{50}$ of 0.5 to 2 μm in a particle size distribution. The SiO powder preferably has $D_{50}$ in a particle size distribution of 0.6 to 1.5 μm, and more preferably 0.7 to 1.3 μm from the viewpoint of more easily realizing sufficient heat ray reflecting, heat ray blocking and light shielding properties. In addition, from the same viewpoint, the SiO powder preferably has $D_{10}$ of 0.1 μm or more and $D_{90}$ of 5 μm or less, more preferably $D_{10}$ of 0.2 μm or more and $D_{90}$ of 3 μm or less.

The SiO powder may be 0.1 to 1 mass % by external addition relative to the total amount of the silica material. The SiO powder is preferably 0.15 to 0.7 mass %, more preferably 0.2 to 0.5 mass % by external addition relative to the total amount of the silica material, from the viewpoint of more easily realizing sufficient heat ray reflecting, heat ray blocking and light shielding properties.

In a preferred embodiment, the mixed powder for pressure molding further comprises the SiO powder having $D_{50}$ of 0.5 to 2 μm in a particle size distribution, and the content of the SiO powder is 0.1 to 1 mass % by external addition relative to the total amount of the silica material.

The producing method of the present invention comprises a step of mixing the silica powder and the fine particulate silica in a dry powder form at a predetermined formulation, or a step of mixing a predetermined amount of the SiO powder with that mixture. When the SiO powder is used, the SiO particles are uniformly mixed into a raw material powder in a substantially aggregate-free manner. Simultaneously with the mixing, a consolidation of the raw material powder proceeds, resulting in the mixed powder with a uniform and suitable tapped bulk density for pressure molding. The fine particulate silica having a small BET diameter is considered to function also as a sintering material. The tapped bulk density of the mixed powder for pressure molding can be controlled by adjusting, for example, the formulation of the fine particulate silica and SiO powder in the mixed powder and the mixing method and the mixing time of the powder. In addition, the amount of pores in the opaque quartz glass can be controlled by adjusting the formulation of the spherical silica powder in the silica material. In the present invention, since the consolidation proceeds simultaneously with the mixing, this operation is hereinafter also referred to as "mixing and consolidation".

The mixing and consolidation is preferably performed such that the tapped bulk density of the mixed powder obtained by the mixing and consolidation is 5 to 20 times the tapped bulk density of the fine particulate silica. When the tapped bulk density of the mixed powder for pressure molding is 5 times or more of the tapped bulk density of the fine particulate silica, the density of the sintered body tends to increase. When the tapped bulk density of the mixed powder for pressure molding is 20 times or less of the tapped bulk density of the fine particulate silica, the strength of the molded body is less likely to decrease. The tapped bulk density of the mixed powder for pressure molding is preferably in the range of 6 to 15 times, more preferably 7 to 10 times of the tapped bulk density of the fine particulate silica. The mixing and consolidation can be performed with common mixing apparatuses such as agitator mixer, ball mill, rocking mixer, cross mixer, V-type mixer.

The mixed powder after the mixing and consolidation can be molded into a desired shape. The molding method can be a dry method commonly used for molding ceramics, such as a die press molding, a cold isostatic pressing method. The pressing force is suitably 10 to 300 MPa, for example. When it is 10 MPa or more, the molded bodies do not collapse, and furthermore the yield during the molding can be maintained. When it is 300 MPa or less, no large facilities are required, the productivity is good, and the cost for production can be reduced, which is desirable.

For sintering conditions, known techniques can be employed. The sintering is preferably, but not limited to, performed in air. The maximum sintering temperature is not particularly limited as long as the mixed powder can be sintered, but is, for example, 1200° C. to 1400° C., preferably 1250° C. to 1350° C., more preferably 1300° C. to 1340° C., and still more preferably 1310° C. to 1330° C. The sintering temperature of 1400° C. or less allows to suppress a decrease in the amount of pores and to more easily realize sufficient heat ray reflecting, heat ray blocking and light shielding properties. The sintering temperature of 1200° C. or more allows to obtain better sintered bodies and to more easily realize sufficient heat ray reflecting, heat ray blocking and light shielding properties.

In the process of the heating and the sintering, the sintering time at the maximum temperature in an atmospheric furnace can be appropriately adjusted in consideration of physical properties of the sintered body and the like, and it can be in the range of 0.5 to 5 hours, for example. When the sintering time is 0.5 hours or more, the density and flexural strength tend to be less likely to decrease. When the sintering time is 5 hours or less, the productivity is improved and the cost for production is easily lowered.

Since the particle size of the fine particulate silica is small as 10 to 50 nm, the bulk density of the fine particulate silica is very low, and the fine particulate silica is unsuitable for granulation and molding. Therefore, in general, the density of a sintered body obtained by sintering the fine particulate silica is small, which is not satisfactory as a quartz glass. In view of this background, in general, the fine particulate silica is rarely used as a sintered material for opaque quartz glasses.

However, as described above, the producing method of the present invention comprises mixing a plurality of types of the specific silica powders having different particle size distributions from each other at a predetermined formulation, or adding and mixing a predetermined amount of the SiO powder with the silica powders, which allows to obtain a mixed powder with a uniform and suitable tapped bulk density for pressure molding. By sintering the mixed powder, it is possible to produce, as a sintered body, the opaque quartz glass containing the pores with irregular shapes and having sufficient heat ray reflecting, heat ray blocking and light shielding properties. The opaque quartz glass of the present invention can be suitably used for a quartz glass cell for optical analysis, a light shielding member and an infrared reflecting member for semiconductor manufacturing apparatuses or infrared heating apparatuses.

In addition, the producing method of the present invention has an effect of making the structure of the sintered body more uniform and shortening the heating time more up to the maximum temperature during sintering.

In addition to the effects above, the opaque quartz glass of the present invention does not require slurrying of the silica powder and is less likely to cause problems associated with the slurrying of the silica powder in conventional methods. That is, the conventional methods comprising the slurrying of the silica powder have a problem of increasing the production cost and contamination risk because the process up to the pressure molding is complicated with the pulverization of the silica powder, the slurrying of the silica powder, spray-drying granulation of the slurry. However, the present invention does not require the slurrying of the silica powder, resulting in producing the opaque quartz glasses with high productivity and suppressing the risk of contamination during the producing.

EXAMPLES

Hereinafter, the present invention will be described in detail by way of Examples, but the present invention is not limited to the Examples.

Sample characteristics were measured as follows.

(1)

The density of the sintered bodies was measured by an Archimedes method.

(2)

The SCE reflectance was measured for samples processed in a thickness of 7 mm with a spectrophotometric colorimeter according to JIS Z 8722. The lowest value in the wavelength range of 350 to 750 nm was noted as standard.

(3)

The brightness L* and saturations a* and b* in L*a*b* color system were measured with a spectrophotometric colorimeter according to JIS Z 8722.

(4)

The infrared reflectance is a reflectance of light having a wavelength of 2 μm in a sample with a thickness of 4 mm.

(5)

The pore size and pore size distribution of pores were determined by the following method. The sample was cut, the cut surface was polished, and the polished surface was observed with a scanning electron microscope and an optical microscope (observation magnification: about 500 to 3000×) to obtain an image (a plurality of images as necessary). The image was processed with an open source and public domain image processing software "ImageJ" to measure an area A of each pore, and then the pore size D was obtained by substituting the area into the following formula (1). Furthermore, the pore size distribution was determined based on the pore sizes and the frequency values with respect to 3000 pores or more (approximately 4000 or less) in total.

$$\text{Pore size } D=(4\times A/\pi)^{1/2} \tag{1}$$

(6)

The circularity was determined by the following method. The image obtained from the measurement in (5) above was processed with the open source and public domain image processing software "ImageJ" to measure an area A and a circumferential length L of each pore, and then a circularity of each of 3000 pores or more (approximately 4000 or less) in total was determined by substituting them into the following formula (2), and an averaged value of these was defined as the circularity in the present invention.

$$\text{Circularity}=4\pi A/L^2 \tag{2}$$

(7)

The area ratio of pores in a microscopic image at a cross section was determined by the following method. The optical microscopic image obtained from the measurement in (5) above was processed with the open source and public domain image processing software "ImageJ" to determine the sum of the areas of pores, S, and the area of the entire processed image, TS, and then a percentage of area basis obtained by substituting them into the following formula (3) was defined as the area ratio of pores in the present invention. The area of the entire image, TS, was an area so that the total number of pores to be measured was 3000 or more (approximately 4000 or less) (a plurality of images may be used as necessary).

$$\text{Area ratio of pores}=S/TS\times 100 \tag{3}$$

(8)

The density distribution was obtained by measuring densities at 10 or more arbitrary locations cut from a sintered body and then calculating with the formula: (max−min)/average×100.

(9)

The brightness L* distribution was obtained by measuring brightnesses L* at 10 or more arbitrary locations cut from a sintered body and then calculating with the formula: (max−min)/average×100.

Example 1

The following materials were used as raw materials for the mixed powder.

- Fine particulate silica: a fumed silica having a BET size of 32 nm, a tapped bulk density of 0.06 g/cm$^3$, a BET specific surface area of 85 m$^2$/g, an OH group concentration of 0.7 mass %, and each content of metallic impurities other than Si of 1 ppm or less.
- Synthetic silica powder: silica particles having $D_{50}$ of 80 μm, $D_{10}$ of 48 μm, $D_{90}$ of 130 μm, and each content of metallic impurities other than Si of 1 ppm or less.
- SiO powder: silicon monoxide particles having $D_{50}$ of 0.9 μm, $D_{10}$ of 0.4 μm, and $D_{90}$ of 2.0 μm.

As shown in Table 1, a mixed powder for pressure molding was obtained by mixing the fumed silica (the fine particulate silica) of 37 mass % and the synthetic silica powder of 63 mass %, adding the SiO powder of 0.3 mass % by external addition into the mixture of the silica particles, and performing the mixing and consolidation in a ball mill without solvents. By the mixing and consolidation, the tapped bulk density of the mixed powder became 0.70 g/cm$^3$. The mixed powder for pressure molding was press-molded at 90 MPa and sintered in air for 3 hours while maintaining the temperature range of 1300 to 1350° C.

The obtained opaque quartz glass had a brightness L* of 90.2 and saturations a* of −0.1 and b* of 1.8 in L*a*b* color system. $D_{50}$ in the pore size distribution of the pores was 7.5 μm, the proportion of pores with pore sizes of 5 μm or less was 32%, the proportion of pores with pore sizes of 15 μm or less was 85%, and the circularity of the pores was 0.58. The opaque quartz glass had a density of 2.15 g/cm$^3$, an SCE reflectance of 75% or more, an infrared reflectance of 80.6%, a density distribution of 1.5%, and a brightness L* distribution of 1.5%. The opaque quartz glass exhibited a sufficient white color without color unevenness, was visually confirmed to be uniform, was glossy, and was excellent in appearance. The area ratio of pores in a microscopic image was 36%. The above results are summarized in Tables 2 and 3.

Example 2

In Example 2, the following spherical silica powder A was used in addition to the materials used in Example 1.

Spherical silica powder A: spherical silica particles having $D_{50}$ of 10 μm, $D_{10}$ of 2 μm, $D_{90}$ of 31 μm, and each content of metallic impurities other than Si of 1 ppm or less.

A mixed powder for pressure molding was obtained by mixing the fumed silica (the fine particulate silica) of 35 mass %, the synthetic silica powder of 55 mass % and the spherical silica powder A of 10 mass %, and adding the SiO powder of 0.3 mass % by external addition into the mixture of the silica particles. By the mixing and consolidation, the tapped bulk density of the mixed powder became 0.70 g/cm$^3$. The mixed powder for pressure molding was sintered in the same manner as in Example 1.

The obtained opaque quartz glass had a brightness L* of 90.5 and saturations a* of −0.1 and b* of 1.9 in L*a*b* color system. $D_{50}$ in the pore size distribution of the pores was 8.1 μm, the proportion of pores with pore sizes of 5 μm or less was 29%, the proportion of pores with pore sizes of 15 μm or less was 77%, and the circularity of the pores was 0.61. The opaque quartz glass had a density of 2.15 g/cm$^3$, an SCE reflectance of 75% or more, an infrared reflectance of 81.2%, a density distribution of 1.5%, and a brightness L* distribution of 1.2%. The opaque quartz glass exhibited a sufficient white color without color unevenness, was visually confirmed to be uniform, was glossy, and was excellent in appearance. The area ratio of pores in a microscopic image was 27%.

Example 3

In Example 3, the following spherical silica powder B was used in addition to the materials used in Example 1.

Spherical silica powder B: spherical silica particles having $D_{50}$ of 20 μm, $D_{10}$ of 6 μm, $D_{90}$ of 42 μm, and each content of metallic impurities other than Si of 1 ppm or less.

A mixed powder for pressure molding was obtained by mixing the fumed silica (the fine particulate silica) of 37 mass %, the synthetic silica powder of 57 mass % and the spherical silica powder B of 6 mass %, and adding the SiO powder of 0.3 mass % by external addition into the mixture of the silica particles. By the mixing and consolidation, the tapped bulk density of the mixed powder became 0.70 g/cm$^3$. The mixed powder for pressure molding was sintered in the same manner as in Example 1.

The obtained opaque quartz glass had a brightness L* of 90.4 and saturations a* of −0.1 and b* of 1.3 in L*a*b* color system. $D_{50}$ in the pore size distribution of the pores was 6.7 μm, the proportion of pores with pore sizes of 5 μm or less was 39%, the proportion of pores with pore sizes of 15 μm or less was 77%, and the circularity of the pores was 0.58. The opaque quartz glass had a density of 2.16 g/cm$^3$, an SCE reflectance of 75% or more, an infrared reflectance of 80.9%, a density distribution of 1.5%, and a brightness L* distribution of 1.3%. The opaque quartz glass exhibited a sufficient white color without color unevenness, was visually confirmed to be uniform, was glossy, and was excellent in appearance. The area ratio of pores in a microscopic image was 21%. FIG. 1 shows an optical micrograph (observation magnification: 1000×) of a quartz glass cross section in Example 3.

Example 4

In Example 4, the above-mentioned fine particulate silica, spherical silica A, and SiO powder were used.

A mixed powder for pressure molding was obtained by mixing the fumed silica (the fine particulate silica) of 30 mass % and the spherical silica powder A of 70 mass %, and adding the SiO powder of 0.3 mass % by external addition into the mixture of the silica particles. By the mixing and consolidation, the tapped bulk density of the mixed powder became 0.82 g/cm$^3$. The mixed powder for pressure molding was sintered in the same manner as in Example 1.

Figure 2:
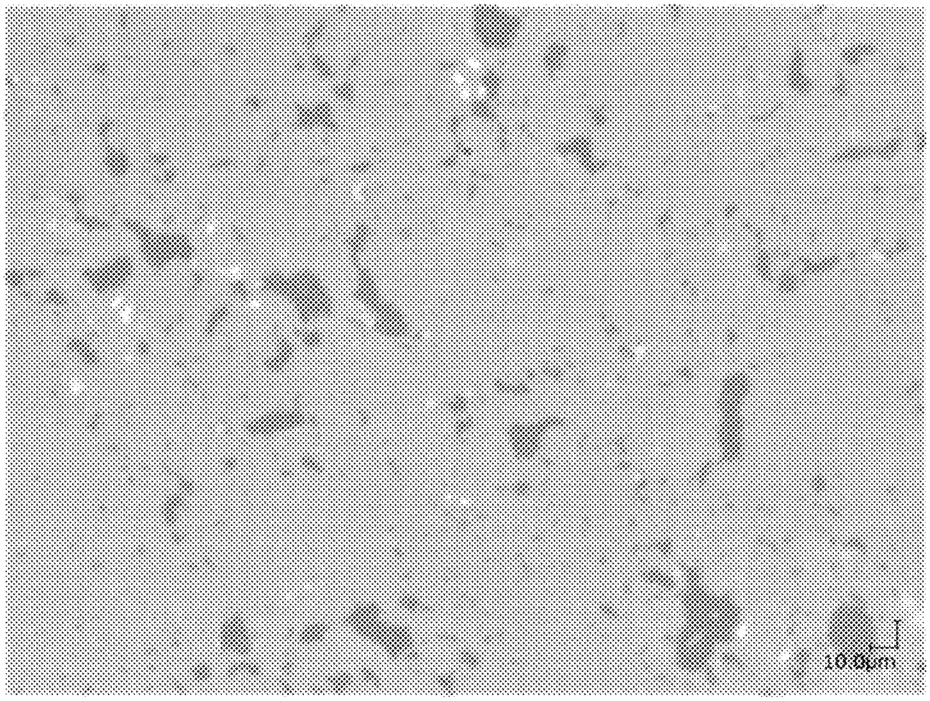
FIG. 2 is an optical micrograph of a quartz glass cross section in Example 4.

The obtained opaque quartz glass had a brightness L* of 93.0 and saturations a* of 0.2 and b* of 1.0 in L*a*b* color system. $D_{50}$ in the pore size distribution of the pores was 11.2 μm, the proportion of pores with pore sizes of 5 μm or less was 17%, the proportion of pores with pore sizes of 15 μm or less was 69%, and the circularity of the pores was 0.56. The opaque quartz glass had a density of 2.16 g/cm$^3$, an SCE reflectance of 75% or more, an infrared reflectance of 85.0%, a density distribution of 1.5%, and a brightness L* distribution of 1.5%. The opaque quartz glass exhibited a sufficient white color without color unevenness, was visually confirmed to be uniform, was glossy, and was excellent in appearance. The area ratio of pores in a microscopic image was 10.3%. FIG. 2 shows an optical micrograph (observation magnification: 1000×) of a quartz glass cross section in Example 4.

Example 5

In Example 5, the above-mentioned fine particulate silica, spherical silica B, and SiO powder were used.

Figure 3:
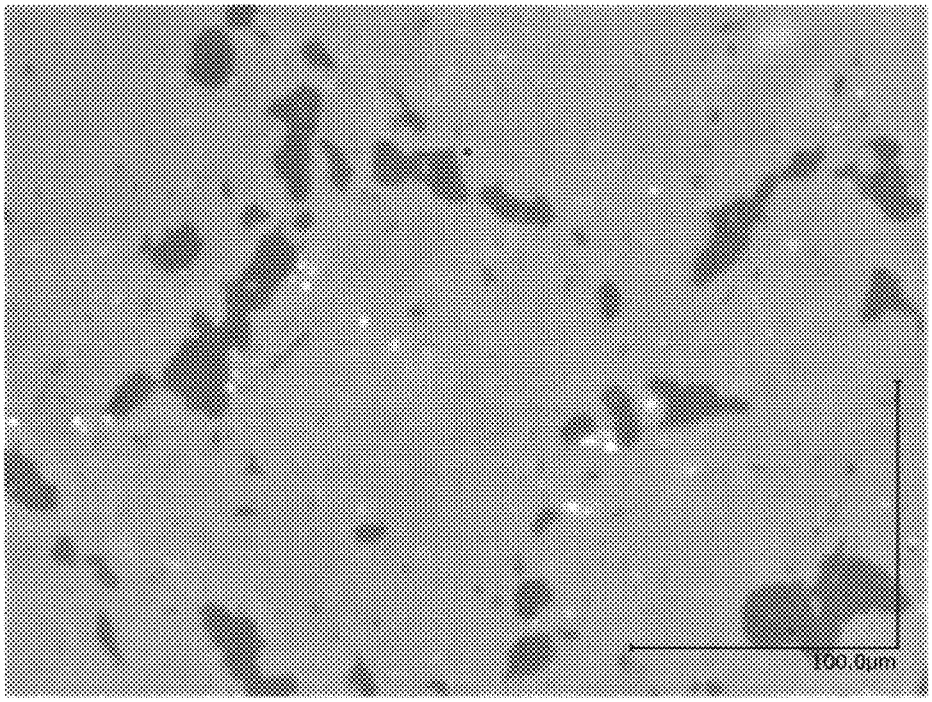
FIG. 3 is an optical micrograph of a quartz glass cross section in Example 5.

A mixed powder for pressure molding was obtained by mixing the fumed silica (the fine particulate silica) of 30 mass % and the spherical silica powder B of 70 mass %, and adding the SiO powder of 0.3 mass % by external addition into the mixture of the silica particles. By the mixing and consolidation, the tapped bulk density of the mixed powder became 0.83 g/cm$^3$. The mixed powder for pressure molding was sintered in the same manner as in Example 1. The evaluation results are shown in Tables 2 and 3. The opaque quartz glass exhibited a sufficient white color without color unevenness, was visually confirmed to be uniform, was glossy, and was excellent in appearance. FIG. 3 shows an optical micrograph (observation magnification: 1000×) of a quartz glass cross section in Example 5.

Example 6

In Example 6, the above-mentioned fine particulate silica, synthetic silica powder, spherical silica A, and SiO powder were used.

Figure 4:
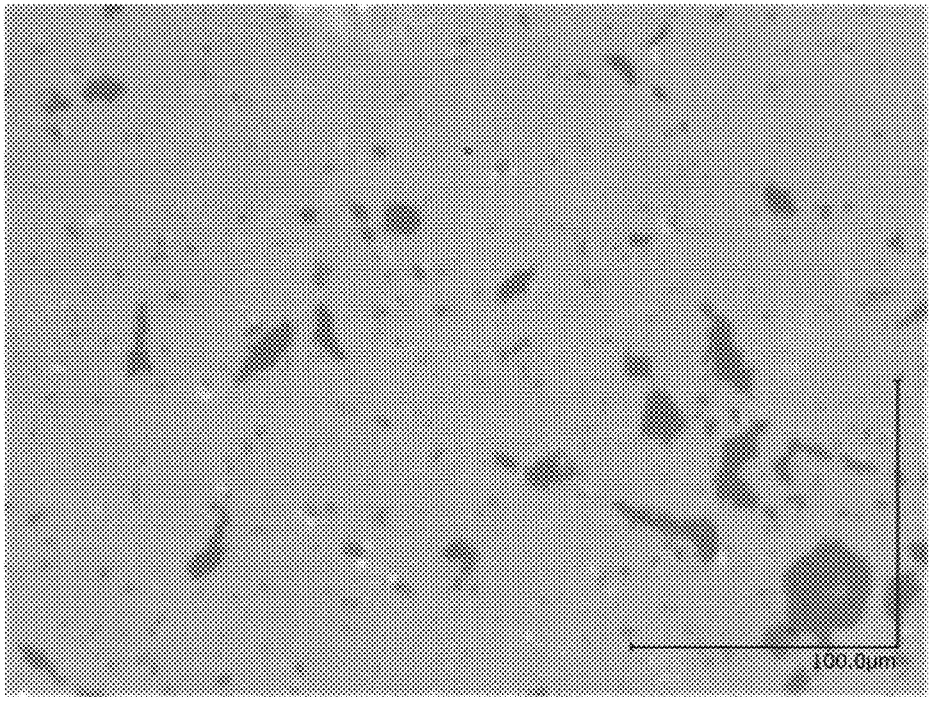
FIG. 4 is an optical micrograph of a quartz glass cross section in Example 6.

A mixed powder for pressure molding was obtained by mixing the fumed silica (the fine particulate silica) of 34 mass %, the synthetic silica powder of 33 mass % and the spherical silica powder A of 33 mass %, and adding the SiO powder of 0.3 mass % by external addition into the mixture of the silica particles. By the mixing and consolidation, the tapped bulk density of the mixed powder became 0.74 g/cm$^3$. The mixed powder for pressure molding was sintered in the same manner as in Example 1. The evaluation results are shown in Tables 2 and 3. The opaque quartz glass exhibited a sufficient white color without color unevenness, was visually confirmed to be uniform, was glossy, and was excellent in appearance. FIG. 4 shows an optical micrograph (observation magnification: 1000×) of a quartz glass cross section in Example 6.

Example 7

In Example 7, the above-mentioned fine particulate silica, synthetic silica powder, spherical silica B, and SiO powder were used.

Figure 5:
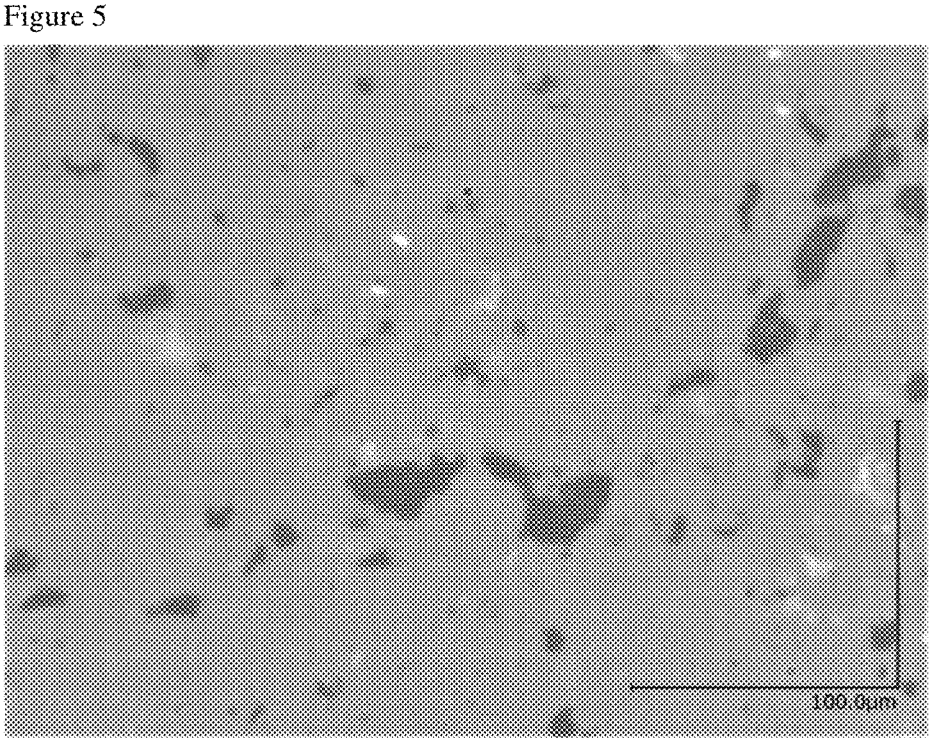
FIG. 5 is an optical micrograph of a quartz glass cross section in Example 7.

A mixed powder for pressure molding was obtained by mixing the fumed silica (the fine particulate silica) of 34 mass %, the synthetic silica powder of 33 mass % and the spherical silica powder B of 33 mass %, and adding the SiO powder of 0.3 mass % by external addition into the mixture of the silica particles. By the mixing and consolidation, the tapped bulk density of the mixed powder became 0.75 g/cm$^3$. The mixed powder for pressure molding was sintered in the same manner as in Example 1. The evaluation results are shown in Tables 2 and 3. The opaque quartz glass exhibited a sufficient white color without color unevenness, was visually confirmed to be uniform, was glossy, and was excellent in appearance. FIG. 5 shows an optical micrograph (observation magnification: 1000×) of a quartz glass cross section in Example 7.

Example 8

In Example 8, the above-mentioned fine particulate silica and synthetic silica powder were used.

A mixed powder for pressure molding was obtained by mixing the fumed silica (the fine particulate silica) of 37 mass % and the synthetic silica powder of 63 mass %. By the mixing and consolidation, the tapped bulk density of the mixed powder became 0.71 g/cm$^3$. The mixed powder for pressure molding was sintered in the same manner as in Example 1. The evaluation results are shown in Tables 2 and 3. The opaque quartz glass exhibited a sufficient white color without color unevenness, was visually confirmed to be uniform, was glossy, and was excellent in appearance.

Example 9

In Example 9, the above-mentioned fine particulate silica and spherical silica A were used.

Figure 6:
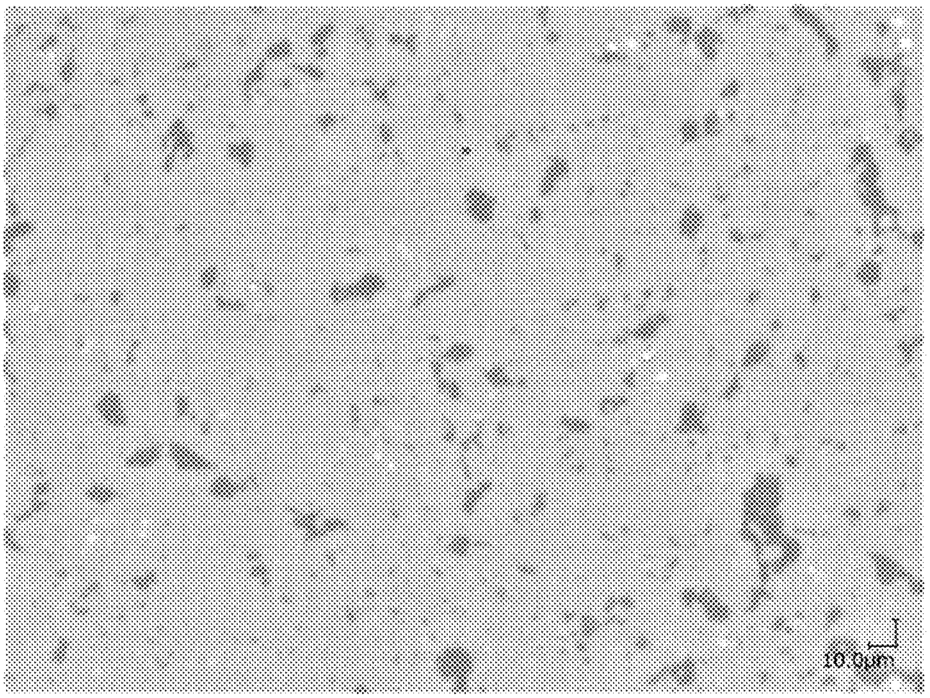
FIG. 6 is an optical micrograph of a quartz glass cross section in Example 9.

A mixed powder for pressure molding was obtained by mixing the fumed silica (the fine particulate silica) of 30 mass % and the spherical silica powder A of 70 mass %. By the mixing and consolidation, the tapped bulk density of the mixed powder became 0.83 g/cm$^3$. The mixed powder for pressure molding was sintered in the same manner as in Example 1. The evaluation results are shown in Tables 2 and 3. The opaque quartz glass exhibited a sufficient white color without color unevenness, was visually confirmed to be uniform, was glossy, and was excellent in appearance. FIG. 6 shows an optical micrograph (observation magnification: 1000×) of a quartz glass cross section in Example 9.

Example 10

In Example 10, the above-mentioned fine particulate silica, synthetic silica powder and spherical silica A were used.

A mixed powder for pressure molding was obtained by mixing the fumed silica (the fine particulate silica) of 34 mass %, the synthetic silica powder of 33 mass % and the spherical silica powder A of 33 mass %. By the mixing and consolidation, the tapped bulk density of the mixed powder became 0.75 g/cm$^3$. The mixed powder for pressure molding was sintered in the same manner as in Example 1. The evaluation results are shown in Tables 2 and 3. The opaque quartz glass exhibited a sufficient white color without color unevenness, was visually confirmed to be uniform, was glossy, and was excellent in appearance.

Comparative Example 1

In Comparative Example 1, the fumed silica (the fine particulate silica) was not used as compared to Example 1.

A mixed powder for pressure molding was obtained by adding the SiO powder of 0.3 mass % by external addition into the synthetic silica powder. By the mixing and consolidation, the tapped bulk density of the mixed powder became 1.20 g/cm$^3$. The mixed powder for pressure molding was press-molded at 90 MPa in the same manner as in Example 1, but a molded article was not obtained and it remained in powder form.

Comparative Example 2

In Comparative Example 2, the synthetic silica powder and SiO powder were not used as compared to Example 1.

The fumed silica (the fine particulate silica) was press-molded at 90 MPa and sintered in air for 3 hours while maintaining the temperature range of 1300 to 1350° C. The obtained sintered body could not be evaluated due to a large number of cracks.

Comparative Example 3

In Comparative Example 3, the amount of the fumed silica (the fine particulate silica) was larger than that in Example 1.

A mixed powder for pressure molding was obtained by mixing the fumed silica (the fine particulate silica) of 60 mass % and the synthetic silica powder of 40 mass %, adding the SiO powder of 0.3 mass % by external addition into the mixture of the silica particles and performing the mixing and consolidation in a ball mill without solvents. By the mixing and consolidation, the tapped bulk density of the mixed powder became 0.55 g/cm$^3$. The mixed powder for pressure molding was sintered in the same manner as in Example 1.

Figure 7:
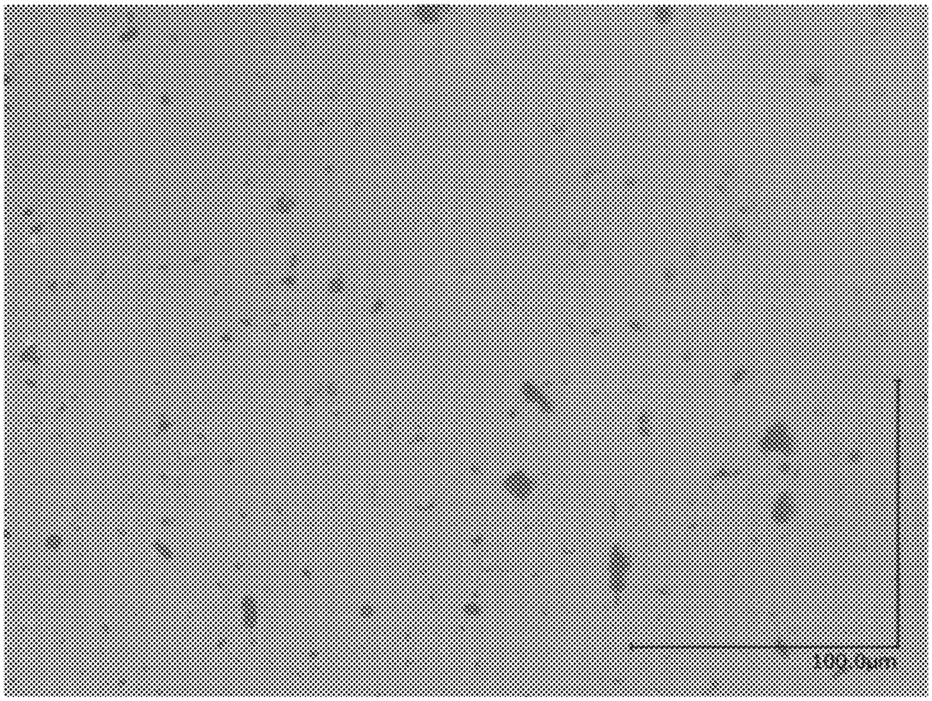
FIG. 7 is an optical micrograph of a quartz glass cross section in Comparative Example 3.

The obtained opaque quartz glass had a brightness L* of 73.3 and saturations a* of −0.1 and b* of 0.0 in L*a*b* color system. $D_{50}$ in the pore size distribution of the pores was 2.0 μm, the proportion of pores with pore sizes of 5 μm or less was 88%, the proportion of pores with pore sizes of 15 μm or less was 99%, and the circularity was 0.68. The opaque quartz glass had a density of 2.19 g/cm$^3$, a SCE reflectance of less than 75%, an infrared reflectance of 63.3%, a density distribution of 0.5%, and a brightness L* distribution of 0.5%. The opaque quartz glass did not exhibit color unevenness and was visually uniform, but did not exhibit sufficient white color. The area ratio of pores in a microscopic image was 3%. FIG. 7 shows an optical micrograph (observation magnification: 1000×) of a quartz glass cross section in Comparative Example 3.

Comparative Example 4

Fused quartz glass with a purity of 99.99% was wet-milled until the maximum particle size was 50 μm or less and $D_{50}$ was 7 μm, and water was added to the milled material to prepare a slurry with a solid content of 78% by weight, and a molded article was obtained by casting using a hard gypsum mold. The molded article was dried at 150° C. for 100 hours, heated at 1400° C. for 1 hour, and then cooled.

The obtained opaque quartz glass had a brightness L* of 80.0 and saturations a* of −0.2 and b* of 0.4 in L*a*b* color system. $D_{50}$ in the pore size distribution of the pores was 6.7 μm, the proportion of pores with pore sizes of 5 μm or less was 36%, the proportion of pores with pore sizes of 15 μm or less was 92%, and the circularity was 0.66. The opaque quartz glass had a density of 2.18 g/cm$^3$, a SCE reflectance of less than 75%, an infrared reflectance of 68.5%, a density distribution of 1.0%, and a brightness L* distribution of 1.0%. The opaque quartz glass did not exhibit color unevenness and was visually uniform, but did not exhibit sufficient white color. The area ratio of pores in a microscopic image was 15%.

TABLE 1

| | Silica material composition (mass %) | | | | | |
|---|---|---|---|---|---|---|
| | Fine particulate silica BET diameter: 32 nm | Synthetic silica $D_{50}$: 80 μm | Spherical silica A $D_{50}$: 10 μm | Spherical silica B $D_{50}$: 20 μm | Amount of SiO added to Silica material (mass %) | Tapped bulk density (g/cm$^3$) |
| Example 1 | 37 | 63 | 0 | 0 | 0.3 | 0.70 |
| Example 2 | 35 | 55 | 10 | 0 | 0.3 | 0.70 |
| Example 3 | 37 | 57 | 0 | 6 | 0.3 | 0.70 |
| Example 4 | 30 | 0 | 70 | 0 | 0.3 | 0.82 |
| Example 5 | 30 | 0 | 0 | 70 | 0.3 | 0.83 |
| Example 6 | 34 | 33 | 33 | 0 | 0.3 | 0.74 |
| Example 7 | 34 | 33 | 0 | 33 | 0.3 | 0.75 |
| Example 8 | 37 | 63 | 0 | 0 | 0 | 0.71 |
| Example 9 | 30 | 0 | 70 | 0 | 0 | 0.83 |
| Example 10 | 34 | 33 | 33 | 0 | 0 | 0.75 |
| Comparative Example 1 | 0 | 100 | 0 | 0 | 0.3 | 1.20 |
| Comparative Example 2 | 100 | 0 | 0 | 0 | 0 | 0.06 |
| Comparative Example 3 | 60 | 40 | 0 | 0 | 0.3 | 0.55 |
| Comparative Example 4 | A slurry with a solid content of 78 wt % was prepared by wet-milling a fused quartz glass and adding water. | | | | | |

TABLE 2

| | Brightness and saturations | | | | Pore size distribution | | Circu- larity of pores |
|---|---|---|---|---|---|---|---|
| | L* | a* | b* | $D_{50}$ (μm) | ≤5 μm (%) | ≤15 μm (%) | |
| Example 1 | 90.2 | −0.1 | 1.8 | 7.5 | 32 | 85 | 0.58 |
| Example 2 | 90.5 | −0.1 | 1.9 | 8.1 | 29 | 77 | 0.61 |
| Example 3 | 90.4 | −0.1 | 1.3 | 6.7 | 39 | 77 | 0.58 |
| Example 4 | 93.0 | 0.2 | 1.0 | 11.2 | 17 | 69 | 0.56 |
| Example 5 | 89.5 | −0.7 | 2.6 | 16.5 | 7 | 43 | 0.57 |
| Example 6 | 88.9 | −0.4 | 1.9 | 14.6 | 16 | 51 | 0.57 |
| Example 7 | 89.4 | −1.0 | 2.0 | 15.2 | 10 | 50 | 0.54 |
| Example 8 | 89.5 | 0.1 | 0.6 | 7.0 | 35 | 83 | 0.56 |
| Example 9 | 92.3 | 0.1 | 0.5 | 10.7 | 18 | 71 | 0.57 |
| Example 10 | 88.5 | 0.1 | 0.5 | 16.1 | 9 | 48 | 0.55 |
| Comparative Example 1 | A powder form was remained so a molded body could not be obtained. | | | | | | |
| Comparative Example 2 | The obtained sintered body could not be evaluated due to a large number of cracks. | | | | | | |
| Comparative Example 3 | 73.3 | −0.1 | 0.0 | 2.0 | 88 | 99 | 0.68 |
| Comparative Example 4 | 80.0 | −0.2 | 0.4 | 6.7 | 36 | 92 | 0.66 |

TABLE 3

| | Density (g/cm$^3$) | SCE reflectance (%) | Infrared reflectance (%) | Density Distribution (%) | Brightness L* distribution (%) | Color unevenness, Cracks | Area ratio of pores (%) |
|---|---|---|---|---|---|---|---|
| Ex. 1 | 2.15 | 75 or more | 80.6 | 1.5 | 1.5 | none | 36 |
| Ex. 2 | 2.15 | 75 or more | 81.2 | 1.5 | 1.2 | none | 27 |

TABLE 3-continued

| | Density (g/cm$^3$) | SCE reflectance (%) | Infrared reflectance (%) | Density Distribution (%) | Brightness L* distribution (%) | Color unevenness, Cracks | Area ratio of pores (%) |
|---|---|---|---|---|---|---|---|
| Ex. 3 | 2.16 | 75 or more | 80.9 | 1.5 | 1.3 | none | 21 |
| Ex. 4 | 2.16 | 75 or more | 85.0 | 1.5 | 1.5 | none | 10.3 |
| Ex. 5 | 2.17 | 75 or more | 78.5 | 1.5 | 1.5 | none | 10.2 |
| Ex. 6 | 2.17 | 75 or more | 78.0 | 1.5 | 1.3 | none | 8.4 |
| Ex. 7 | 2.17 | 75 or more | 78.3 | 1.5 | 1.2 | none | 7.3 |
| Ex. 8 | 2.16 | 75 or more | 79.4 | 1.7 | 1.8 | none | 34 |
| Ex. 9 | 2.16 | 75 or more | 84.6 | 1.6 | 1.7 | none | 10.7 |
| Ex. 10 | 2.16 | 75 or more | 78.5 | 1.6 | 1.8 | none | 7.8 |
| Com. Ex. 1 | A powder form was remained so a molded body could not be obtained. | | | | | | |
| Com. Ex. 2 | The obtained sintered body could not be evaluated due to a large number of cracks. | | | | | | |
| Com. Ex. 3 | 2.19 | less than 75 | 63.3 | 0.5 | 0.5 | none | 3 |
| Com. Ex. 4 | 2.18 | less than 75 | 68.5 | 1.0 | 1.0 | none | 15 |

INDUSTRIAL APPLICABILITY

The present invention is useful in the field with respect to opaque quartz glasses. The opaque quartz glass of the present invention can be suitably used for, for example, a quartz glass cell for optical analysis, a light shielding member and an infrared reflecting member for semiconductor manufacturing apparatuses or infrared heating apparatuses, due to its sufficient heat ray reflecting, heat ray blocking and light shielding properties. In addition, the present invention allows to provide a large opaque quartz glass ingot having sufficient heat ray reflecting, heat ray blocking and light shielding properties and sufficient uniformity with good productivity.

The invention claimed is:

1. An opaque quartz glass containing pores with irregular shapes dispersed in a glass body, wherein the opaque quartz glass has a pore size distribution of the pores having $D_{50}$ of 4 μm to 30 μm, a proportion of pores with pore sizes of 5 μm or less of 1% to 50%, and a proportion of pores with pore sizes of 15 μm or less of 30% to 90%, and an area ratio of pores in a microscopic image at a cross section of 5% or more.

2. The opaque quartz glass according to claim 1, wherein a circularity of pores is 0.62 or less.

3. The opaque quartz glass according to claim 1, wherein when $D_{50}$ is 10 μm or less, the area ratio is 15% or more, when $D_{50}$ is more than 10 μm, the area ratio is less than 15%.

4. The opaque quartz glass according to claim 1, wherein the opaque quartz glass has an infrared reflectance of 75% or more, an SCE reflectance of 75% or more at a wavelength of 350 nm to 750 nm, and a brightness L* of 85 or more in L*a*b* color system.

5. The opaque quartz glass according to claim 1, wherein the opaque quartz glass has an absolute value of a saturation a* of 2 or less and an absolute value of b* of 4 or less in L*a*b* color system.

6. The opaque quartz glass according to claim 1, wherein each content of metallic impurities is 1 ppm or less.

7. The opaque quartz glass according to claim 1, wherein the opaque quartz glass has a density of 2.10 g/cm$^3$ to 2.18 g/cm$^3$.

8. The opaque quartz glass according to claim 1, wherein the opaque quartz glass has a density distribution of 2% or less and a brightness L* distribution of 2% or less.

9. A method for producing an opaque quartz glass containing pores with irregular shapes dispersed in a glass body, wherein the opaque quartz glass has a pore size distribution of the pores having $D_{50}$ of 4 to 30 μm, a proportion of pores with pore sizes of 5 μm or less of 1% to 50%, and a proportion of pores with pore sizes of 15 μm or less of 30% to 90%, and an area ratio of pores in a microscopic image at a cross section of 5% or more, said method comprising steps of:

pressure-molding a mixed powder of a silica powder which is silica particles having $D_{50}$ of 5 μm to 100 μm in a particle size distribution and a fine particulate silica which is silica particles having a BET diameter of 10 nm to 50 nm, wherein the content of the fine particulate silica is 20 mass % to 50 mass % relative to the total amount of a silica material including the silica powder and the fine particulate silica, and sintering the pressure-molded article.

10. The method for producing opaque quartz glass according to claim 9, wherein (a) the silica powder is a synthetic silica powder having $D_{50}$ of 30 μm to 100 μm in a particle size distribution, or (b) the silica powder contains a synthetic silica powder having $D_{50}$ of 30 μm to 100 μm in a particle size distribution and a spherical silica powder having $D_{50}$ of 5 μm to 50 μm in a particle size distribution, or (c) the silica powder is a spherical silica powder having $D_{50}$ of 5 μm to 50 μm in a particle size distribution.

11. The method for producing opaque quartz glass according to claim 10, wherein in the case (b), the content of the spherical silica powder is 1 mass % to 20 mass % relative to the total amount of the silica material.

12. The method for producing opaque quartz glass according to claim 10, when the synthetic silica powder and the spherical silica powder are present respectively, $D_{10}$ in a particle size distribution of the synthetic silica powder is ⅓ or more of $D_{50}$ and $D_{90}$ is 3 times or less of $D_{50}$, and $D_{10}$ in a particle size distribution of the spherical silica powder is ⅕ or more of $D_{50}$ and $D_{90}$ is 5 times or less of $D_{50}$.

13. The method for producing opaque quartz glass according to claim 9, wherein the fine particulate silica satisfies at least one of the four requirements of (i) a tapped bulk density is 0.03 g/cm$^3$ to 0.10 g/cm$^3$, (ii) a BET specific surface area is 50 m$^2$/g to 100 m$^2$/g, (iii) an OH group concentration is 0.5 mass % to 1.0 mass %, and (iv) each content of metallic impurities other than Si is 1 ppm or less.

14. The method for producing opaque quartz glass according to claim 9, wherein the mixed powder further comprises a SiO powder which is silicon monoxide particles having $D_{50}$ of 0.5 μm to 2 μm in a particle size distribution, and the content of the SiO powder is 0.1 mass % to 1 mass % by external addition relative to the total amount of the silica material.

15. The method for producing opaque quartz glass according to claim 14, wherein the SiO powder has $D_{10}$ of 0.1 μm or more and $D_{90}$ of 5 μm or less in a particle size distribution.

16. The method for producing opaque quartz glass according to claim 9, wherein a tapped bulk density of the mixed powder for pressure molding is 5 to 20 times more than a tapped bulk density of the fine particulate silica.

* * * * *